United States Patent
Wang et al.

(10) Patent No.: US 9,130,218 B2
(45) Date of Patent: Sep. 8, 2015

(54) HYBRID ENERGY STORAGE SYSTEMS UTILIZING REDOX ACTIVE ORGANIC COMPOUNDS

(75) Inventors: Wei Wang, Kennewick, WA (US); Wu Xu, Richland, WA (US); Liyu Li, Richland, WA (US); Zhenguo Yang, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 645 days.

(21) Appl. No.: 13/439,083

(22) Filed: Apr. 4, 2012

(65) Prior Publication Data

US 2013/0266836 A1    Oct. 10, 2013

(51) Int. Cl.
*H01M 8/18* (2006.01)
*H01M 12/08* (2006.01)

(52) U.S. Cl.
CPC .............. *H01M 8/188* (2013.01); *H01M 12/08* (2013.01); *Y02E 60/528* (2013.01)

(58) Field of Classification Search
CPC .............................. H01M 12/08; H01M 8/188
USPC ............................................. 429/72, 105, 213
See application file for complete search history.

(56) References Cited

U.S. PATENT DOCUMENTS

2010/0047671 A1 *   2/2010   Chiang et al. .................... 429/50

FOREIGN PATENT DOCUMENTS

| JP | 2011216371 A | * | 10/2011 |
| WO | 2009-224141 A | | 10/2009 |
| WO | 2010-143634 A1 | | 12/2010 |
| WO | 2011-131959 A1 | | 10/2011 |

OTHER PUBLICATIONS

Li et al., "Electrochemical Properties of an All-Organic Redox Flow Battery Using 2,2,6,6-Tetramethyl-1-Piperidinyloxy and N-Methylphthalimide", Electrochem. and Solid-State Let., 14 (12) A171-A173 (2011).*
Duduta, Minai, et al., "Semi-Solid Lithium Rechargeable Flow Battery," Materials Views, 2011, pp. 511-516, vol. 1, Advanced Energy Materials, Cambridge, MA, USA.
Li, Zhen, et al., "Electrochemical Propertys of an All-Organic Redox Flow Battery Using 2, 2, 6,6-Tetramethy1-1-Piperidinyloxy and N-Methylphthalimide," Electrochemical and Solid-State Letters, Oct. 26, 2011, pp. A171-A173, vol. 14, The Electrochemical Society, Changsha, China.

(Continued)

*Primary Examiner* — Zachary Best
(74) *Attorney, Agent, or Firm* — Klarquist Sparkman, LLP (57) ABSTRACT

Redox flow batteries (RFB) have attracted considerable interest due to their ability to store large amounts of power and energy. Non-aqueous energy storage systems that utilize at least some aspects of RFB systems are attractive because they can offer an expansion of the operating potential window, which can improve on the system energy and power densities. One example of such systems has a separator separating first and second electrodes. The first electrode includes a first current collector and volume containing a first active material. The second electrode includes a second current collector and volume containing a second active material. During operation, the first source provides a flow of first active material to the first volume. The first active material includes a redox active organic compound dissolved in a non-aqueous, liquid electrolyte and the second active material includes a redox active metal.

5 Claims, 5 Drawing Sheets

(56) References Cited

OTHER PUBLICATIONS

Liu, Qinghua, et al., "Non-aqueous chromium acetylacetonate electrolyte for redox flow batteries," Electrochemistry Communications, Sep. 22, 2010, pp. 1634-1637, vol. 12, Science Direct, Ann Arbor, USA.

Sleightholme, Alice E.S., et al., "Non-aqueous manganese acetylacetonate electrolyte for redox flow batteries," Journal of Power Sources, Feb. 11, 2011, pp. 5742-5745, vol. 196, ScienceDirect, Ann Arbor, USA.

Liu, Qinghua, et al., "Non-aqueous vanadium acetylacetonate electrolyte for redox flow batteries," Electrochemistry Communications, Oct. 13, 2009, pp. 2312-2315, vol. 11, ScienceDirect, Tianjin, CN.

International Search Report/Written Opinion for International Application No. PCT/US2012/069077, International Filing Date Dec. 12, 2012, Date of Mailing Aug. 23, 2013.

Li, Zhen, et al., Electrochemical Properties of an All-Organic Redox Flow Battery Using 2, 2, 6, 6-Tetramethyl-1-Piperidinyloxy and N-Methylphtalimide Electrochemical and Solid-State Letters, 2011, vol. 14, Iss. 12, pp. A171-A173, Wuhan, China.

Wang, Wei, et al., "Anthraquinone with tailored structured for nonaqueous metal-organic redox flow battery," Chemical Communications, 2012, vol. 48, Issue 53, pp. 6669-6671, published online May 28, 2012, Richland, Washington, USA.

\* cited by examiner

HYBRID ENERGY STORAGE SYSTEMS UTILIZING REDOX ACTIVE ORGANIC COMPOUNDS

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Redox flow batteries (RFB) have attracted considerable research interests primarily due to their ability to store large amounts of power and energy, up to multi-MW and multi-MWh, respectively. RFB systems are considered one of the most promising technologies to be utilized not only for renewable energy resources integration, but also to improve the efficiency of grid transmission and distribution. With the energy supplied from externally stored electrolytes, the dissociation of energy capacity and power capability offers unique design latitude for RFBs to be sized for a wide spectrum of power and energy storage applications. Other advantages of RFBs include high safety, quick response, long service life, deep discharge ability, etc.

Due to limits of the water electrolysis potential window and the solubility of the active materials in water, traditional aqueous RFBs are typically considered to be low energy density systems (<25 Wh/L in most true flow battery systems). While significant progress has been made to improve the energy density, aqueous RFB systems can still be severely hindered by the poor solubility and stability of the active materials in the solutions. In this regard, a non-aqueous energy storage system that utilizes at least some aspects of RFB systems is attractive because it offers the expansion of the operating potential window, which can have a direct impact on the system energy and power densities.

SUMMARY

This document describes energy storage systems having a separator separating first and second electrodes. The first electrode comprises a first current collector and a first volume containing a first active material. The second electrode comprises a second current collector and a second volume containing a second active material. The energy storage systems are characterized, during operation, by a first source operably connected to the first volume and configured to provide a flow of first active material, wherein the first active material comprises a redox active organic compound dissolved in a non-aqueous, liquid electrolyte and the second active material comprises a redox active metal.

The second active material can be a solid, a liquid, or a mixture of solid and non-aqueous liquid materials. In one embodiment, the second active material comprises lithium. An example of a mixture of solid and liquid materials includes, but is not limited to a flowable suspension. An example of a liquid includes, but is not limited to, a non-aqueous solution. In one embodiment, the second active material comprises redox active metal ions dissolved in a non-aqueous liquid. Preferably, the redox active metal ions comprise ions of transition metals. Particular examples can include, but are not limited to, titanium ions, zinc ions, chromium ions, manganese ions, iron ions, nickel ions, and copper ions. In some embodiments, wherein the second active material comprises liquid and is flowable, the energy storage systems can comprise a second source operably connected to the second volume and configured to provide a flow of second active material.

In one embodiment, the first active material has a concentration of redox active organic compound that is greater than, or equal to 0.1 M. In another embodiment, the concentration is greater than, or equal to, 0.2 M. A redox active organic compound, as used herein, can refer to a compound comprising at least a bond between a carbon and a hydrogen atom. Examples can include, but are not limited to, organic-soluble derivatives of anthraquinone (AQ) and 2,2,6,6-tetramethyl-1-piperidinyloxy (TEMPO). One instance of an organic-soluble derivative of AQ is 1,5-bis(2-(2-(2-methoxyethoxy)ethoxy)ethoxy)anthracene-9,10-dione (15D3GAQ).

In one embodiment, the energy storage system is configured such that the first electrode functions as a cathode and the second cathode functions as an anode. The embodiments described herein are not limited to primary cells, but can encompass secondary (i.e., rechargeable) cells. In such cases, the mode of operation (i.e., charging or discharging) can determine the function of the electrodes. For example, the cathode might be considered to be the negative electrode and the anode might be considered the positive electrode during recharging. While discharging, the functions would be reversed.

Another embodiment described herein is an energy storage system having a separator separating a cathode and an anode. The cathode comprises a positive current collector and a cathode volume containing a cathode active material. The anode comprises a negative current collector and an anode volume containing an anode active material. The energy storage system is characterized during operation by a source operably connected to the cathode volume and configured to provide a flow of cathode active material, wherein the cathode active material comprises TEMPO or an organic-soluble derivative of AQ dissolved in a non-aqueous electrolyte and the anode active material comprises lithium metal. In a preferred embodiment, the concentration of the TEMPO or the organic-soluble derivative of AQ is greater than, or equal to, 0.2 M. In another embodiment, the anode active material is a solid. One instance of an organic-soluble derivative of AQ is 1,5-bis(2-(2-(2-methoxyethoxy)ethoxy)ethoxy)anthracene-9,10-dione (15D3GAQ).

In yet another embodiment, the energy storage system is characterized during operation by a first source operably connected to the cathode volume and configured to provide a flow of cathode active material and by a second source operably connected to the anode volume and configured to provide a flow of anode active material, wherein the cathode active material comprises a redox active organic compound dissolved in a non-aqueous electrolyte at a concentration of at least 0.1 M, and the anode active material comprises a redox active metal. The anode active material can comprise a solid and flowable liquid materials. Preferably, the anode active material comprises redox active transition metal ions dissolved in a non-aqueous liquid.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figure 1:
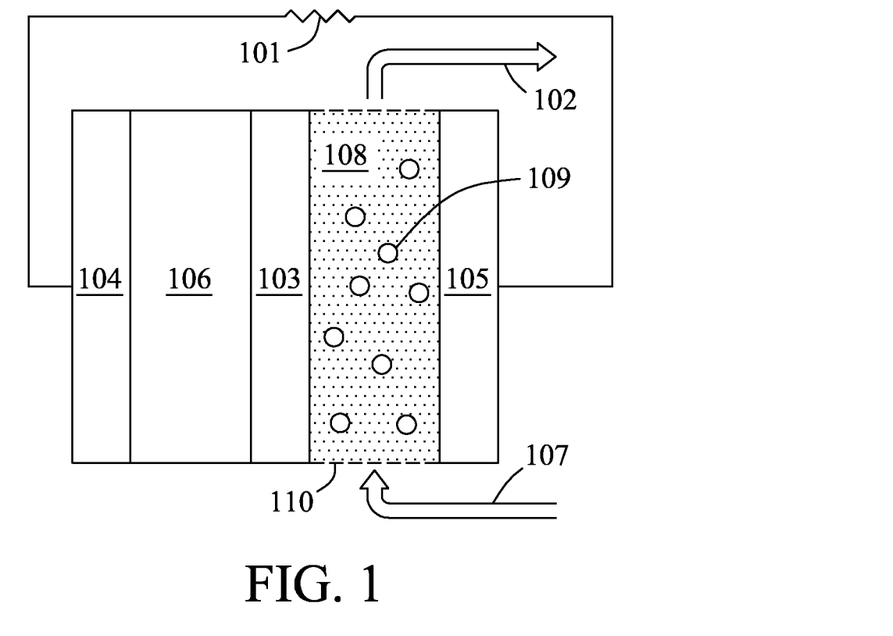
FIG. 1 is a schematic diagram depicting an energy storage system in which the second active material is a solid, according to embodiments of the present invention.

FIGS. 1-7 show a variety of embodiments of the present invention. Referring first to FIG. 1, a schematic diagram depicts one embodiment in which the second active material 106 is a solid and comprises a redox active metal. The second active material is in electrical contact with a load 101 through a second current collector 104. The second electrode is separated from the first electrode by a separator 103. The first active material 110 comprises a redox active organic compound 109 dissolved in a non-aqueous electrolyte 108. The first active material is in electrical contact with the load 101 through the first current collector 105. The first active material can be flowed to the first volume from a source 107 in a batch or continuous manner. The first active material exits the first volume by pathway 102. When operated as a rechargeable energy storage system, pathway 102 returns the electrolyte and first active material to an electrolyte reservoir (not shown) for recirculation to the first volume via 107.

Figure 2:
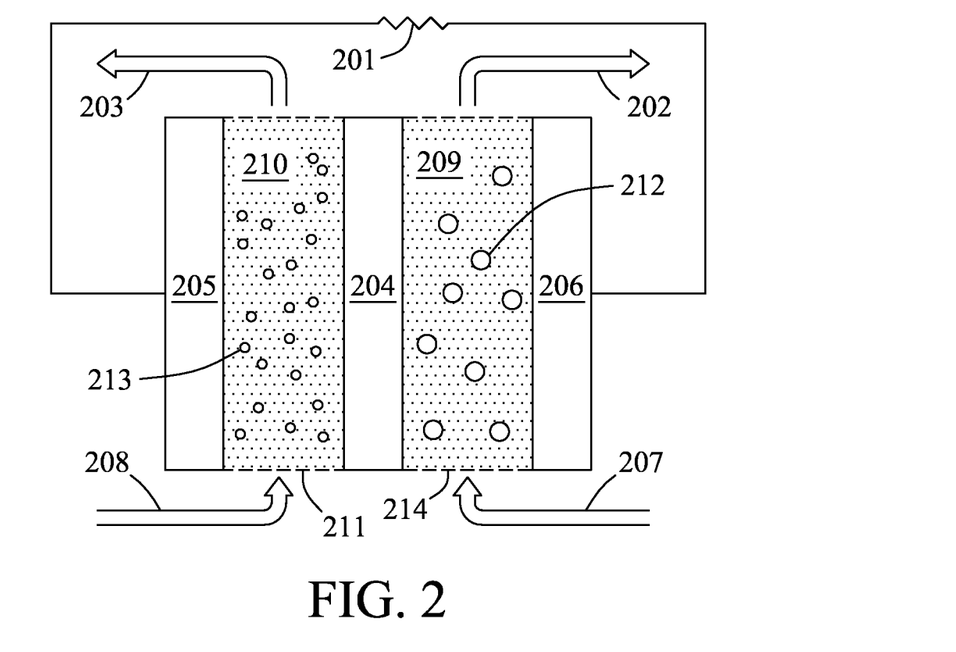
FIG. 2 is a schematic diagram depicting an energy storage system in which the second active material is flowable, according to embodiments of the present invention.

FIG. 2 is a diagram of an energy storage system in which both electrodes comprise flowable active materials. The first active material 214 comprises a redox active organic compound 212 dissolved in a non-aqueous electrolyte 209. The second active material 211 comprises a redox active metal 213 that is either an ion dissolved in a non-aqueous liquid 210 or is a solid metal mixed with a non-aqueous liquid 210 in a flowable suspension. The first and second active materials can flow into the first and second volumes from separate sources 207 and 208, respectively. The active materials flow out of the first and second volumes through pathways 202 and 203, respectively. As described earlier, in some embodiments, a reservoir (not shown) can be arranged between 202 and 207 and between 203 and 208. A separator 204 separates the first and second electrodes. As illustrated, the energy storage system can be connected to a load 201 through first and second current collectors 206 and 205, respectively.

In one example, an energy storage system comprises a hybrid metal-organic redox flow battery based on a modified anthraquinone (AQ) molecule as the positive electrolyte and lithium metal as the negative electrode. As used herein, "hybrid" in the context of energy storage systems can encompass at least one of two different senses. In one sense, the energy storage system can be a hybrid RFB since one electrode comprises an active material that is fluid and can flow, while the other electrode comprises an active material that is a solid. In another sense, the energy storage system can be a hybrid RFB since the active materials are chemically very different—one a redox active organic compound and the other a redox active metal or dissolved metal ions. The redox active metal can be a solid or a solid portion in a mixture having flowable non-aqueous liquid materials.

In one example, an energy storage system comprises a hybrid metal-organic redox flow battery based on a modified anthraquinone (AQ) molecule as the positive electrolyte and lithium metal as the negative electrode. As used herein, "hybrid" in the context of energy storage systems can encompass at least one of two different senses. In one sense, the energy storage system can be a hybrid RFB since one electrode comprises an active material that is fluid and can flow, while the other electrode comprises an active material that is a solid. In another sense, the energy storage system can be a hybrid RFB since the active materials are chemically very different—one a redox active organic compound and the other a redox active metal or dissolved metal ions.

Figure 3A:
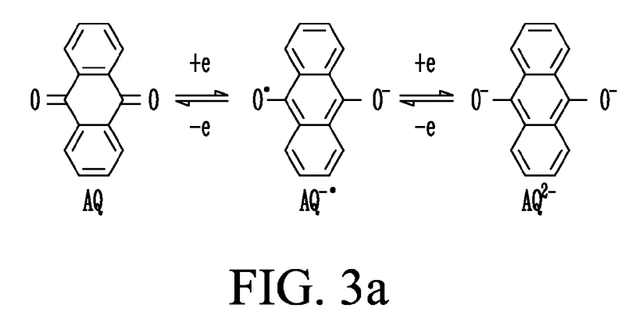
FIG. 3a is an illustration depicting the redox mechanism of anthraquinone-based molecules.

The redox mechanism of AQ involves a two-electron disproportionation in two stages during discharge processes: the formation of radical anions at the first stage followed by dianion formation in the second (see FIG. 3a). However, quinone-based compounds with short chain substituents typically have very low solubility (less than 0.05 M) in most electrolytes of relatively high polarity. Accordingly, embodiments of the present invention can utilize modified AQ cores that exhibit improved solubility as the energy bearing redox active agent.

Figure 3B:
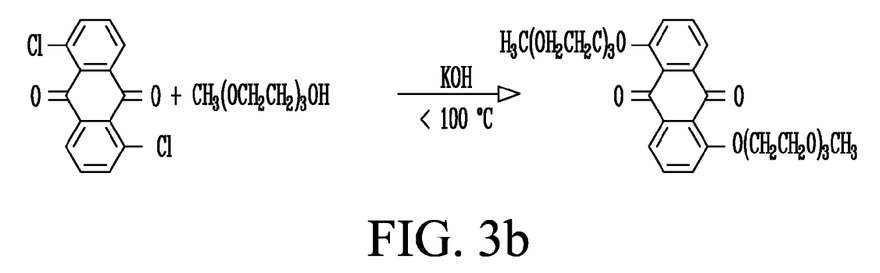
FIG. 3b is an illustration depicting the synthesis of one modified anthraquinone compound, 15D3GAQ.

One example of a modified AQ molecule is 1,5-bis(2-(2-(2-methoxyethoxy)ethoxy)ethoxy)anthracene-9,10-dione (abbreviated as 15D3GAQ), shown in FIG. 3b. The introduction of two triethylene glycol monomethyl ether groups into the AQ molecular structure has a large effect on the solubility, and the resulting molecule is soluble in most polar solvents and nonaqueous electrolytes. The compound was synthesized via nucleophilic aromatic substitution of 1,5-dichloroanthaquinone in the presence of triethylene glycol monomethyl ether as both reagent and solvent, and potassium hydroxide base to generate the nucleophile. The mixture was typically stirred at a temperature slightly below 100° C. for 3 h to ensure completion of the reaction. After purification the 15D3GAQ material was obtained as a pure yellow solid in a yield over 80%.

The nonaqueous electrolyte preparation and redox flow cell assembly were all completed inside a glove box filled with purified argon of moisture and oxygen content less than 1 ppm. The RFB electrolyte was prepared by dissolving 15D3GAQ with $LiPF_6$ in propylene carbonate (PC) at room temperature, with concentrations of 0.25 M 15D3GAQ and 1.0 M $LiPF_6$. The available redox reactions and their reversibility and kinetics of 15D3GAQ were first investigated by cyclic voltammetry (CV) using a static cell. The cell was assembled with a graphite felt disk of 0.3 cm thick soaked in 0.2 mL of the above electrolyte as working electrode and a piece of lithium foil disk as counter electrode with a polypropylene (PP) separator in between. The whole assembly was subsequently sealed in the cell compartment. An electrochemical station was used to identify redox couples and electrochemical reversibility in the voltage range between 1.3 V and 3.5 V at a scan rate of 0.1 $mVs^{-1}$.

Figure 4:
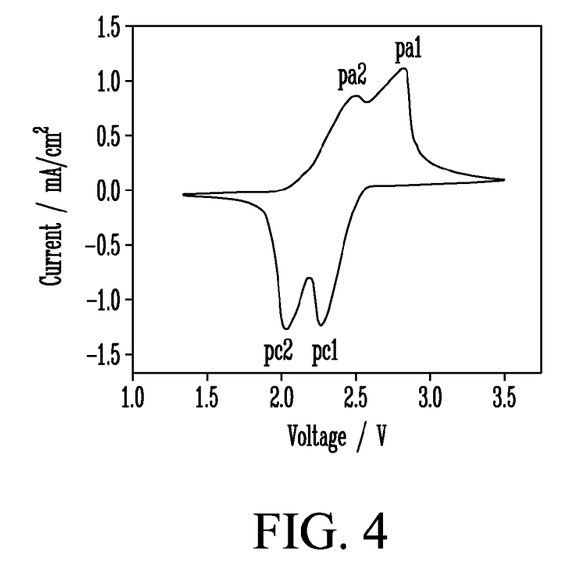
FIG. 4 shows the CV curve of 15D3GAQ in 1.0 M $LiPF_6$/PC electrolyte during the first cycle using Li foil as a counter electrode.

FIG. 4 shows the CV curve of 15D3GAQ in 1.0 M $LiPF_6$/PC electrolyte during the first cycle, where the current density was normalized to the geometrical area of the working electrode. The CV spectrum of 15D3GAQ shows two well defined redox peaks. During the first cathodic scan, two sharp peaks at 2.27 V (pc1) and 2.04 V (pc2) correspond to the reductions of the first and second —C=O groups to the =C—O$^-$ anions. The corresponding oxidative peaks are located at about 2.82 V (pa1) and 2.50 V (pa2). The peak separations for the two redox peaks are 0.55 V (pc1/pa1) and 0.46 V (pa2/pc2), respectively. Such a big difference between the redox peaks (~0.5 V) indicates the large polarization of this material during charge and discharge processes. The electrochemical cycling performance of the 15D3GAQ static cell was evaluated using a constant-current method on a battery tester. The 15D3GAQ static cell was cycled in the voltage window between 1.8 V and 2.8 V at a constant current density of 1.0 $mAcm^{-2}$.

Figure 5A:
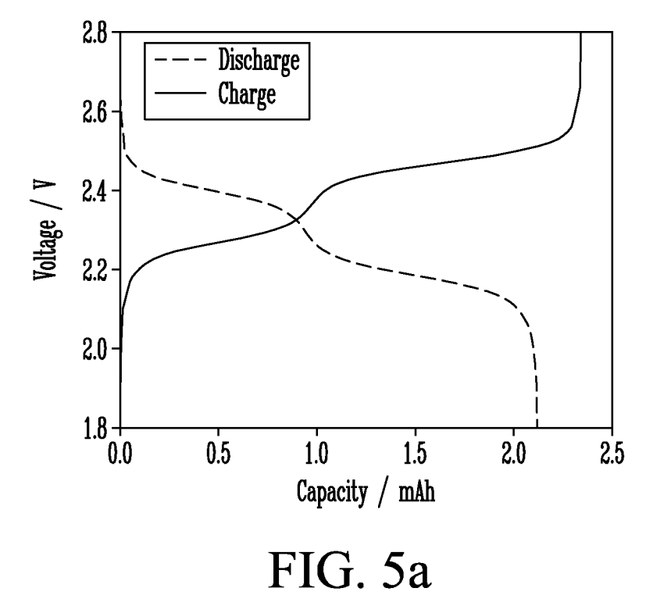
FIGS. 5a and 5b show, respectively, the charge/discharge profiles and the electrochemical cycling performance of an energy storage system based on the redox reaction between 15D3GAQ and $Li/Li^+$ in the 1M $LiPF_6$/PC supporting electrolyte, according to embodiments of the present invention.

FIG. 5a shows the charge/discharge profiles of the energy storage system based on the redox reaction between 15D3GAQ and Li/Li$^+$ in the 1M $LiPF_6$/PC supporting electrolyte. Confirming the CV scan result, two voltage plateaus are clearly observed in a typical cell voltage profile during charge and discharge processes (see FIG. 5a). The voltage plateaus at ~2.4 V during discharge and ~2.45 V during charge correspond to the formation of radical anions, while the voltage plateaus at ~2.15 V during discharge and ~2.25 V during charge represent the dianion formation, as illustrated in FIG. 3. The voltage profiles demonstrated by the 15D3GAQ static cell also exhibited two distinct voltage plateaus in the flow battery static cell tests.

Figure 5B:
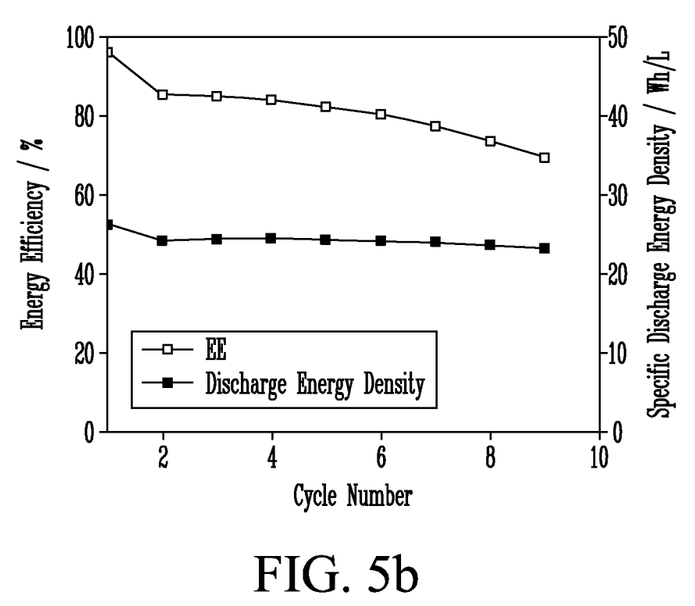

FIG. 5b shows the electrochemical cycling performance in terms of the energy efficiency and the discharge energy density of the hybrid metal organic RFB with 0.25 M 15D3GAQ in 1.0 M $LiPF_6$/PC solution as the positive electrolyte (i.e., the positive cathode side) and lithium metal as negative electrode, in which an overall energy efficiency of ~82% is achieved. The discharge energy density, representing the ultimate capability of the cell to deliver useful energy, is also plotted in FIG. 5b. A specific volumetric energy density close to 25 $WhL^{-1}$ is obtained, where the calculation was based on the positive electrolyte volume.

Figure 6:
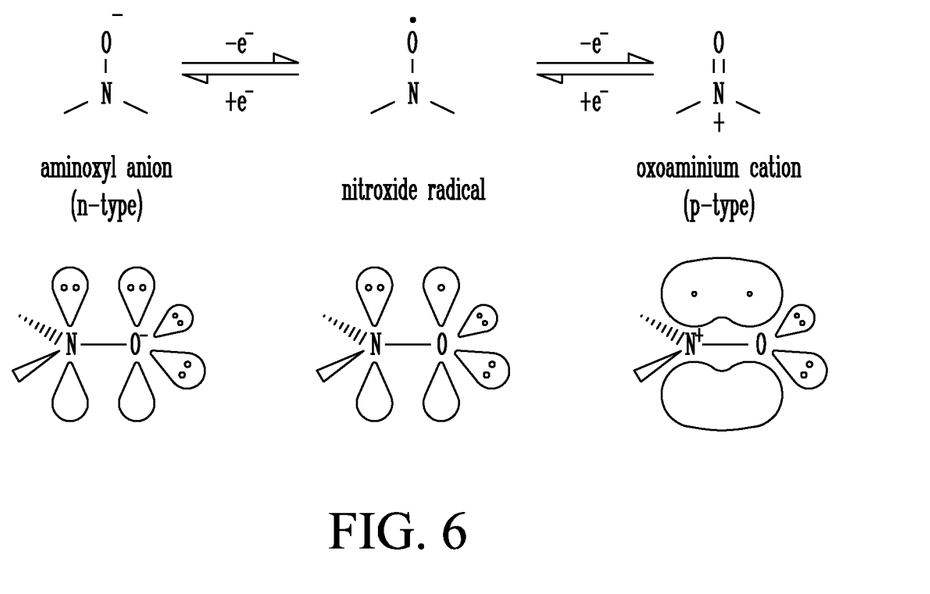
FIG. 6 is an illustration depicting the redox mechanism of a nitroxide radical compound.

In another example, an energy storage system comprises a hybrid metal-organic redox flow battery based on a positive electrolyte containing 2,2,6,6-Tetramethyl-1-piperidinyloxy (TEMPO) free radical dissolved in a non-aqueous electrolyte solution of 1 mol/L $LiPF_6$ in EC:DMC (1:1). A lithium metal foil serves as the anode. As shown in FIG. 6, the nitroxide radical possesses two redox couples, in which the TEMPO can be either oxidized to form the corresponding oxoammonium cation or reduced to form the aminoxy anion. Both redox reactions are reversible.

The nonaqueous electrolyte preparation and redox flow cell assembly were all completed inside a glove box filled with purified argon of moisture and oxygen content less than 1 ppm. The RFB electrolyte was prepared by dissolving TEMPO with $LiPF_6$ in EC:DMC (1:1) solvent at room temperature with concentrations of 0.5 M TEMPO and 1.0 M $LiPF_6$.

The available redox reactions and their reversibility and kinetics of TEMPO were first investigated using a static cell. The cell was assembled with a graphite felt disk of 0.3 cm thick soaked with 0.2 mL of the above electrolyte as working electrode. A piece of lithium foil disk was used as a counter electrode. A polypropylene (PP) separator separated the two electrodes. The whole assembly was subsequently sealed into the cell compartment. The electrochemical cycling performance of the TEMPO static cell was evaluated using a constant-current method on a battery tester. The TEMPO static cell was cycled in the voltage window between 3.0 V and 4.0 V at a constant current density of 1.0 $mAcm^{-2}$.

Figure 7A:
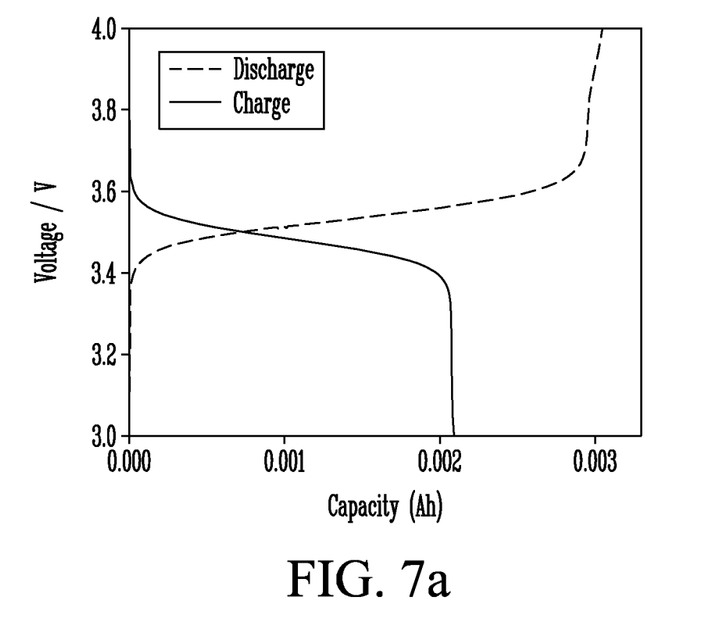
FIGS. 7a and 7b show the electrochemical cycling performance of the energy storage system based on the redox reaction between TEMPO and $Li/Li^+$ in the 1M $LiPF_6$ in EC:DMC (1:1) according to embodiments of the present invention.

FIG. 7a shows the charge/discharge profiles of the energy storage system based on the redox reaction between TEMPO and Li/Li$^+$ in the 1M $LiPF_6$ in EC:DMC (1:1) supporting electrolyte. One voltage plateau was clearly observed in a typical cell voltage profile during charge and discharge processes. The voltage plateau at ~3.5 V corresponds to the redox reactions of TEMPO free radical and oxoaminium cation as illustrated in FIG. 6.

Figure 7B:
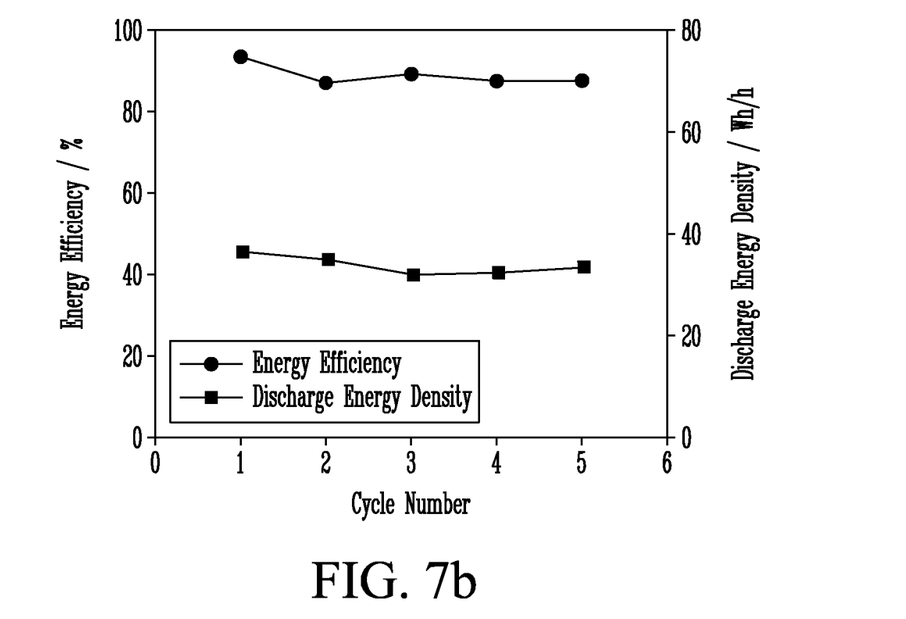

FIG. 7b shows the electrochemical cycling performance in terms of the energy efficiency and the discharge energy density of the hybrid MORFB with 0.5 M TEMPO and 1.0 M $LiPF_6$ in EC:DMC (1:1) as the positive electrolyte solution and lithium metal as the negative electrode, in which an overall energy efficiency of close to 90% is achieved. A specific volumetric energy density close to ~32 Wh/L is obtained, where the calculation was based on the positive electrolyte volume.

In yet another example, an energy storage system utilizes a second active material that is flowable. In particular, the second active material can comprise a mixture of solids and liquids, or it can comprise a liquid. One example of a mixture can include a powder comprising a redox active metal suspended in a liquid. Another example includes a powder with little or no liquid that can flow through the second volume under some motive force, such as can be provided by a pump or extruder.

A second active material that is a liquid can comprise a redox active metal ion in an electrolyte. The redox active metal ion can be a transition metal ion. In such an instance, the redox couple on one side of the separator involves a metal while the redox couple on the other side of the separator involves an organic compound. One example is to use the $Cr^{2+/3+}$ ions dissolved in non-aqueous solvent as the negative electrolyte (anolyte) and TEMPO dissolved in non-aqueous solvent as the positive electrolyte (catholyte) to form redox flow battery with operational voltage of approximately 2.3V.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. An energy storage system having a separator separating first and second electrodes, the first electrode comprising a first current collector and a first volume containing a first active material the second electrode comprising a second current collector and a second volume containing a second active material, the energy storage system characterized during operation by a first source operably connected to the first volume and configured to provide a flow of first active material, the first active material comprising a redox active organic compound dissolved in a non-aqueous electrolyte and the second active material comprising a redox active metal, wherein the redox active organic compound comprises 1 5-bis(2-(2-(2-methoxyethoxy)ethoxy)ethoxy)anthracene-9,10-dione (151)3GAQ).

2. The system of claim 1, herein the second active material comprises a solid.

3. The system of claim 1, further comprising a second source operably connected to the second volume and configured to provide during operation a flow of second active material.

4. The system of claim 3, wherein the second active material is a mixture of solid and flowable non-aqueous liquid materials.

5. The system of claim 3, wherein the second active material comprises a liquid.

* * * * *